US012646281B2

(12) United States Patent
Bouskila et al.

(10) Patent No.: US 12,646,281 B2
(45) Date of Patent: Jun. 2, 2026

(54) SELF-CHECKOUT ILLUMINATION SYSTEM

(71) Applicant: TOSHIBA GLOBAL COMMERCE SOLUTIONS, INC., Durham, NC (US)

(72) Inventors: Yeshai Bouskila, Plano, TX (US); Jeremy V. Patrick, Cary, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/885,425

(22) Filed: Sep. 13, 2024

(65) Prior Publication Data

US 2026/0080649 A1     Mar. 19, 2026

(51) Int. Cl.
| | |
|---|---|
| *G06V 10/141* | (2022.01) |
| *G06V 10/75* | (2022.01) |
| *H04N 23/56* | (2023.01) |
| *H04N 23/60* | (2023.01) |
| *H04N 23/61* | (2023.01) |

(52) U.S. Cl.
CPC .......... *G06V 10/141* (2022.01); *G06V 10/759* (2022.01); *H04N 23/56* (2023.01); *H04N 23/61* (2023.01); *H04N 23/64* (2023.01)

(58) Field of Classification Search
CPC .... G06V 10/141; G06V 10/759; H04N 23/56; H04N 23/61; H04N 23/64
See application file for complete search history.

(56) References Cited

U.S. PATENT DOCUMENTS

| | | | |
|---|---|---|---|
| 2016/0379027 A1* | 12/2016 | Bruni ................... | G06K 7/1413 235/462.41 |
| 2017/0017944 A1 | 1/2017 | Sasahara | |
| 2019/0019173 A1 | 1/2019 | Kinno et al. | |

| | | | |
|---|---|---|---|
| 2019/0026999 A1* | 1/2019 | Kinno ................. | G07G 1/0063 |
| 2019/0073880 A1 | 3/2019 | Nobuoka et al. | |
| 2019/0087678 A1* | 3/2019 | Ito ....................... | G06F 18/2113 |
| 2020/0394404 A1 | 12/2020 | Iwamoto et al. | |
| 2021/0049574 A1 | 2/2021 | Shiraishi et al. | |

(Continued)

FOREIGN PATENT DOCUMENTS

| | | | | |
|---|---|---|---|---|
| JP | 2020-166640 A | 10/2020 | | |
| WO | WO-2022005305 A1 * | 1/2022 | ......... | G01N 21/8901 |

OTHER PUBLICATIONS

International Search Report and Written Opinion received for PCT Patent Application No. PCT/US2024/057379, mailed on May 23, 2025, 12 pages.

*Primary Examiner* — Shadan E Haghani

(74) *Attorney, Agent, or Firm* — Patterson + Sheridan, LLP; Gero G. McClellan

(57)     ABSTRACT

A self-checkout system and techniques for illuminating one or more items placed within a predefined zone of the self-checkout system are provided. In one aspect, a self-checkout system includes one or more cameras, a light source, and a computing device. The computing device is configured to implement an operation, including: receiving one or more images of one or more items placed within the predefined zone, the images being captured by the cameras; determining an identity of the one or more items placed within the predefined zone, based at least in part on the captured images; and causing the light source to project an illuminated indicator onto at least one item of the one or more items placed within the predefined zone, based on the identity of the at least one item.

19 Claims, 7 Drawing Sheets

(56)                    References Cited

U.S. PATENT DOCUMENTS

| | | | |
|---|---|---|---|
| 2021/0312206 A1* | 10/2021 | Meidar | G06N 3/02 |
| 2022/0044221 A1 | 2/2022 | Ueki et al. | |
| 2022/0119148 A1* | 4/2022 | Kiessner | B65B 57/12 |
| 2023/0120081 A1* | 4/2023 | Laico | B29C 45/768 |
| | | | 356/240.1 |
| 2023/0169508 A1* | 6/2023 | Murakami | G06Q 20/34 |
| | | | 705/44 |
| 2023/0169833 A1* | 6/2023 | Murakami | G06Q 20/40145 |
| | | | 235/383 |

\* cited by examiner

Figure 3:
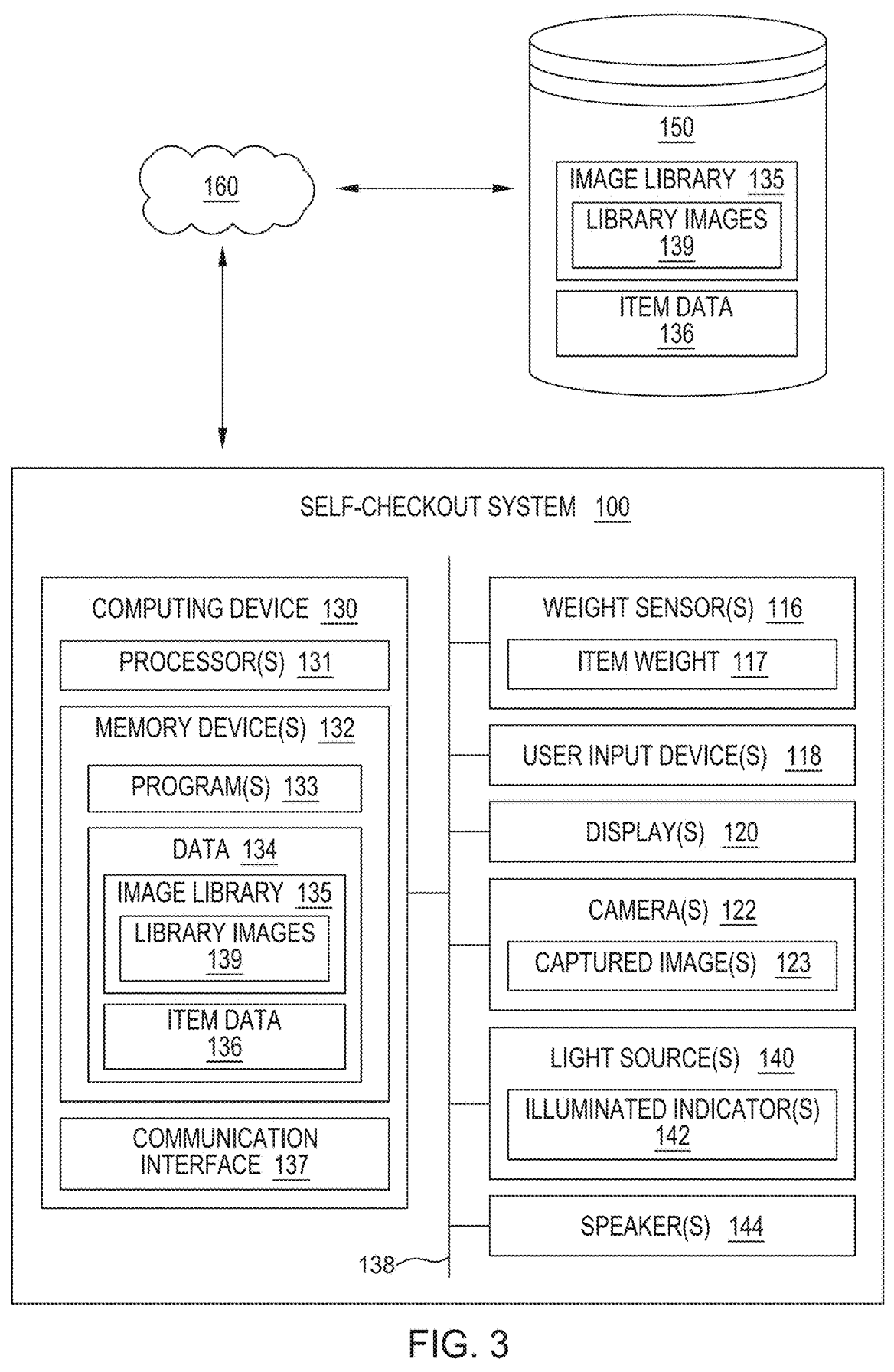

150

IMAGE LIBRARY  135

LIBRARY IMAGES
139

ITEM DATA
136

160

SELF-CHECKOUT SYSTEM  100

COMPUTING DEVICE  130

PROCESSOR(S)  131

MEMORY DEVICE(S)  132

PROGRAM(S)  133

DATA  134

IMAGE LIBRARY  135

LIBRARY IMAGES
139

ITEM DATA
136

COMMUNICATION
INTERFACE  137

WEIGHT SENSOR(S)  116

ITEM WEIGHT  117

USER INPUT DEVICE(S)  118

DISPLAY(S)  120

CAMERA(S)  122

CAPTURED IMAGE(S)  123

LIGHT SOURCE(S)  140

ILLUMINATED INDICATOR(S)
142

SPEAKER(S)  144

CAPTURE IMAGES OF ITEMS PLACED ON OR
NEAR PLATFORM OF A SELF-CHECKOUT
SYSTEM

204

IDENTIFY THE ITEMS PLACED ON OR NEAR
PLATFORM USING THE CAPTURED IMAGES

206

PROJECT AN ILLUMINATED INDICATOR ONTO
AT LEAST ONE OF THE ITEMS BASED ON ITS
IDENTITY

SELF-CHECKOUT ILLUMINATION SYSTEM

BACKGROUND

Many retail stores offer buyers the option to purchase items at self-service kiosks. Self-service kiosks have become desirable to both buyers and retailers. For buyers, the kiosks offer reduced wait times as compared to using a cashier lane. Retailers also benefit from reduced labor costs, as one member of staff can monitor several self-service counters. During a checkout transaction, a buyer can scan product barcodes for each product and can place them on a platform to be weighed and/or monitored during the transaction.

BRIEF DESCRIPTION OF THE DRAWINGS

FIG. 3 illustrates a schematic view of the self-checkout system of FIG. 1, according to one or more embodiments of the present disclosure.

DETAILED DESCRIPTION

Figure 1:
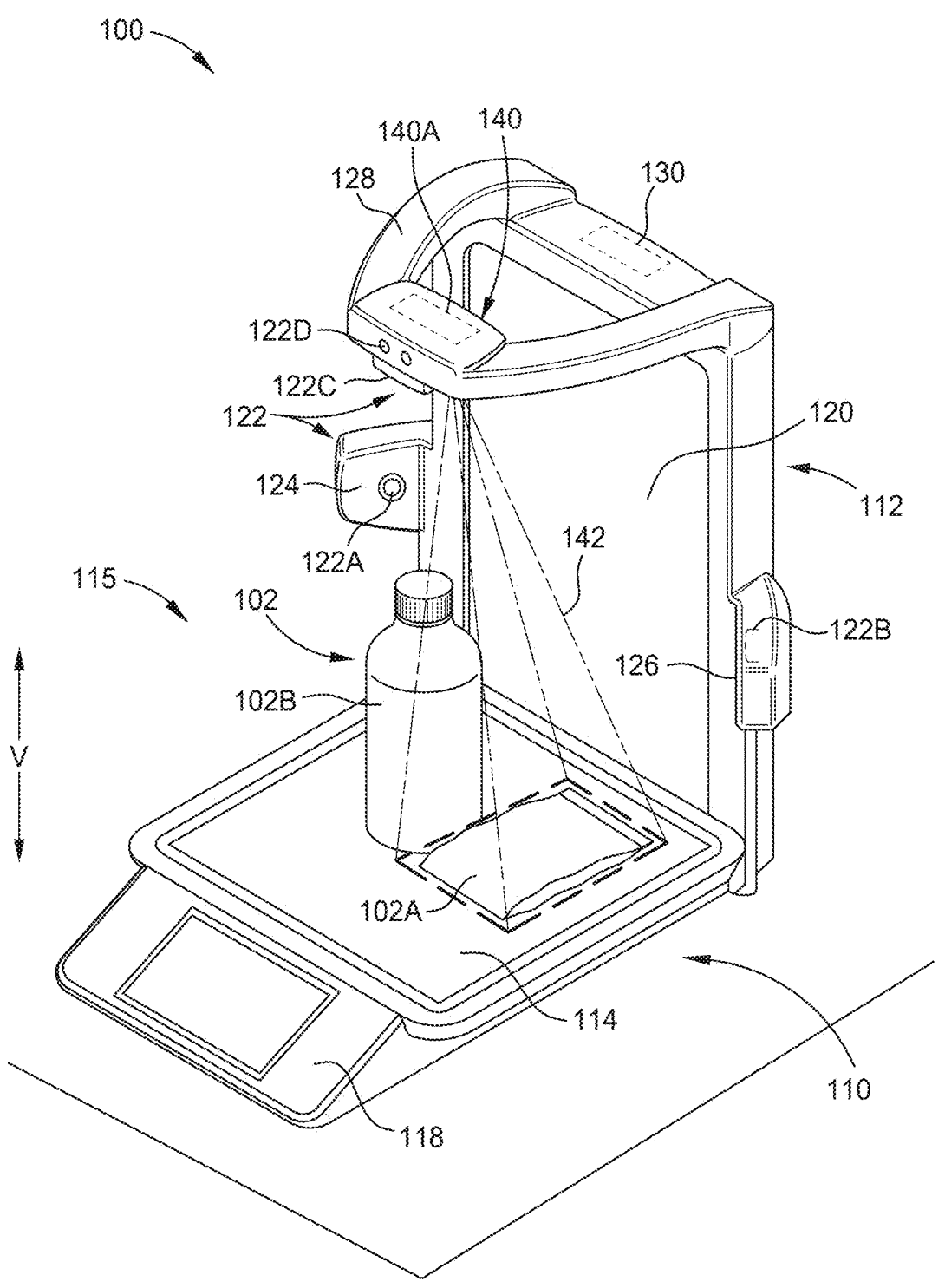
FIG. 1 illustrates a perspective view of an exemplary self-checkout system according to one or more embodiments of the present disclosure.

Self-service kiosks can require high buyer engagement, including scanning product barcodes for each product and carefully placing such products onto a platform, e.g., so that the scanned products can be weighed and/or monitored during a checkout transaction. In some instances, a buyer may place an unpurchaseable item onto the platform, which may skew the sensed weight of the items on the platform or otherwise delay the transaction. Moreover, a buyer may place an item near, but not on, the platform, which may also affect the sensed weight of the items and the overall checkout transaction. Leaving these issues unresolved can lead to buyer frustration and may require store personnel to resolve the issue. The skewing of the sensed weight can also potentially lead to scale malfunctions and/or incorrect scale calibrations as well as issues with the barcode scanner.

Embodiments disclosed herein are directed to smart, intuitive self-checkout systems that address one or more of the challenges noted above. In at least one example embodiment, a self-checkout system can be equipped with features to illuminate one or more items within a predefined zone. In another example, the self-checkout system includes features that illuminate items on or near a platform of the self-checkout system. The self-checkout system can include a light source, such as a projector or laser, that can be controlled to illuminate one or more of the items placed within the predefined zone based on their identities. A computer vision system of the self-checkout system can include one or more cameras and a computing device. The cameras can capture images of the items on or near the platform within the predefined zone, and these captured images can be used by the computing device to identify the items. For instance, the captured images of the items can be compared to images of known items stored in an image library. In at least one example, known items can include purchasable items (i.e., known items that are available for purchase at the store) or non-purchasable items (i.e., known items that are not available for purchase at the store). Items on or near the platform within the predefined zone can be identified when the captured images of an item match an image of the image library. When the captured images of an item do not match any of the images of the image library, the item can be identified as an unknown item.

As noted above, the light source can be controlled to illuminate one or more of the items placed within the predefined zone based on the identities of the items. As one example, the light source can be controlled to project an illuminated indictor onto a known non-purchasable item, e.g., to suggest to a shopper and/or store personnel that the item be removed from the platform so as not to skew the sensed weight of the items on the platform. The illuminated indicator, or light directed onto the item by the light source, can outline the item or otherwise highlight the item to a shopper or store personnel. As another example, the light source can be controlled to project an illuminated indictor onto an unknown item, e.g., to suggest to a shopper and/or store personnel that the item be removed from the platform and/or that the unknown item should be further investigated by store personnel. As yet another example, the light source can be controlled to project an illuminated indictor onto a known purchasable item that is placed near, but not on, the platform, e.g., to suggest to a shopper and/or store personnel that the item be moved onto the platform so that the sensed weight of the items can be more accurately determined and/or so that the item can be more readily monitored. Accordingly, illuminating certain items within the predefined zone can advantageously facilitate a more frictionless and interactive shopping experience for a buyer and can allow store personnel to more quickly identify issues and resolve problems. Moreover, scale malfunctions, incorrect scale calibrations, and issues with barcode scanners can be eliminated or otherwise reduced, among other benefits.

FIG. 1 illustrates a perspective view of an exemplary self-checkout system 100 according to one or more embodiments of the present disclosure. In one example, the self-checkout system 100 can be a self-service checkout kiosk. For reference, the self-checkout system 100 defines a vertical direction V.

Buyers may select one or multiple items for purchase within a retail store and independently complete a checkout transaction at the self-checkout system 100. The self-checkout system 100 can include a base 110 and a back panel 112. The back panel 112 can be arranged perpendicular with respect to the base 110 as illustrated in FIG. 1. A shopper may place one or more items intended for purchase on a platform 114 of the base 110 during a checkout transaction. The shopper may later remove the items from the platform 114 upon completing or canceling the transaction.

One or more components and/or combinations of components for facilitating a self-checkout transaction can be included in the housing of the base 110 and/or the back panel 112. For instance, the base 110 can include at least one load cell or weight sensor 116 (not shown in FIG. 1; see FIG. 3) positioned under the platform 114. The weight sensor 116 is configured to sense the weight of each and/or all items placed on the platform 114.

The base 110 can include any combination of one or more user input devices 118, for example, a touch screen, keypad, card reader, and/or near-field receiver. The shopper may communicate with the self-checkout system 100 using any of the user input devices 118. For example, the user input device 118 may be configured to tender payment methods. The back panel 112 can include a display 120 for presenting information to a shopper during the checkout process. For example, the display 120 can present an updated checkout list, checkout instructions, and/or payment instructions to a shopper during a checkout transaction.

Further, the self-checkout system 100 can include one or more cameras 122 to capture respective viewpoints within and/or surrounding a predefined zone 115, or buy zone. For example, the cameras 122 can be configured to capture the items placed on or near the platform 114 and/or a shopper standing in close proximity to the self-checkout system 100. Captured viewpoints of and/or surrounding the predefined zone 115 can include, for example, a left-side viewpoint, a right-side viewpoint, an overhead viewpoint (e.g., angled down towards the platform 114), and/or a forward viewpoint (e.g., angled towards the shopper). The one or more cameras 122 may be attached or detached from the housing of the self-checkout system 100.

As an example, the self-checkout system 100 of FIG. 1 includes a right arm 124 and a left arm 126 each extending from the back panel 112 at opposite sides of the platform 114. Each of the right and left arms 124, 126 can include a camera, e.g., for capturing right and left viewpoint images of the predefined zone 115 or items placed on or near the platform 114, respectively. An item positioned near, but not on, the platform 114 can be captured by the cameras 122 when the item is within a field of view of one or more of the cameras 122. The right arm 124 includes a first camera 122A arranged to capture right side viewpoint images and the left arm 126 includes a second camera 122B arranged to capture left side viewpoint images. Further, the back panel 112 can include a halo 128 that has a third camera 122C arranged to capture overhead viewpoint images of the predefined zone 115 or items placed on or near the platform 114. In addition, the halo 128 can include one or more forward-facing cameras 122D oriented in a forward-facing position, e.g., to capture images of the shopper standing near the self-checkout system 100. The cameras 122 can be configured to capture images based on an indication that one or more items have been detected in the predefined zone 115, or that a shopper has approached within a predetermined proximity of the self-checkout system 100, or based on the weight sensor 116 sensing items on the platform 114, or a combination thereof, or some other trigger condition.

The self-checkout system 100 can also include a computing device 130, which can be arranged in the back panel 112, for example. The computing device 130 can also be arranged in other locations, such as in the base 110 underneath the platform 114. The computing device 130 can be arranged as shown in FIG. 3 and will be described in greater detail further below.

In at least some example embodiments, the computing device 130 and cameras 122 can form part of a computer vision system of the self-checkout system 100. Images captured by the cameras 122, which can be still images or frames of a video, can be routed to the computing device 130 for processing. The computing device 130 can used the captured images to identify the one or more items placed on or near the platform 114. Feedback from the weight sensor 116 can also be fed to the computing device 130 for processing, e.g., in assisting with identification of the one or more items placed on or near the platform 114.

The self-checkout system 100 can also include one or more light sources 140. In at least some example embodiments, the halo 128 can include or support a light source 140A, or overhead light source. The light source 140A can be a projector, a laser, or some other light-emitting device arranged to project light, such as an illuminated indicator 142, onto one or more items 102 placed within the predefined zone 115, or rather, placed on or near the platform 114. In some embodiments, the light source 140A can have a field of illumination greater than the area of the platform 114, e.g., so that items placed near, but not on, the platform 114 can be highlighted by the light source 140A. In this regard, the predefined zone 115 can extend beyond the platform 114. Further, by arranging the light source 140A in or mounted to the halo 128, the light source 140A can be positioned directly above the platform 114 as shown in FIG. 1, which allows the light source 140A to project light from an overhead position onto one or more of the items 102.

The light source 140A can be arranged to project light generally downward toward the platform 114 and onto one or more items based on their identities, as identified by the computing device 130 of the computer vision system. In FIG. 1, for example, based on the determined identity of one of the items 102 placed on the platform 114, the light source 140A can be controlled by the computing device 130 to project an illuminated indicator 142 onto one of the items placed on the platform 114, which in this example is a snack bag 102A. The snack bag 102A can be identified by the computing device 130 as a snack bag that is a known non-purchasable item (i.e., an item that is not purchasable but is known to the computing device 130). Alternatively, the snack bag 102A can be identified as an unknown item (i.e., an item that is not purchasable and unknown to the computing device 130). Consequently, the computing device 130 can control the light source 140A to project the illuminated indicator 142 onto the snack bag 102A to suggest that the snack bag 102A be removed from the platform 114. This can facilitate a more frictionless and interactive shopping experience for the shopper.

The other item on the platform 114 in FIG. 1, which is a bottled water 102B in this example, can also be identified by the computing device 130 based on captured images from the cameras 122. The bottled water 102B can be identified by the computing device 130 as a bottled water that is a known purchasable item (i.e., an item that is purchasable and known to the computing device 130). Accordingly, the light source 140A can be controlled by the computing device 130 not to illuminate the bottled water 102B with an illuminated indicator.

In at least some other embodiments, in addition or alternatively to the light source 140A arranged in the halo 128, the self-checkout system 100 can include one or more light sources positioned in other locations. One example is provided below.

Figure 2:
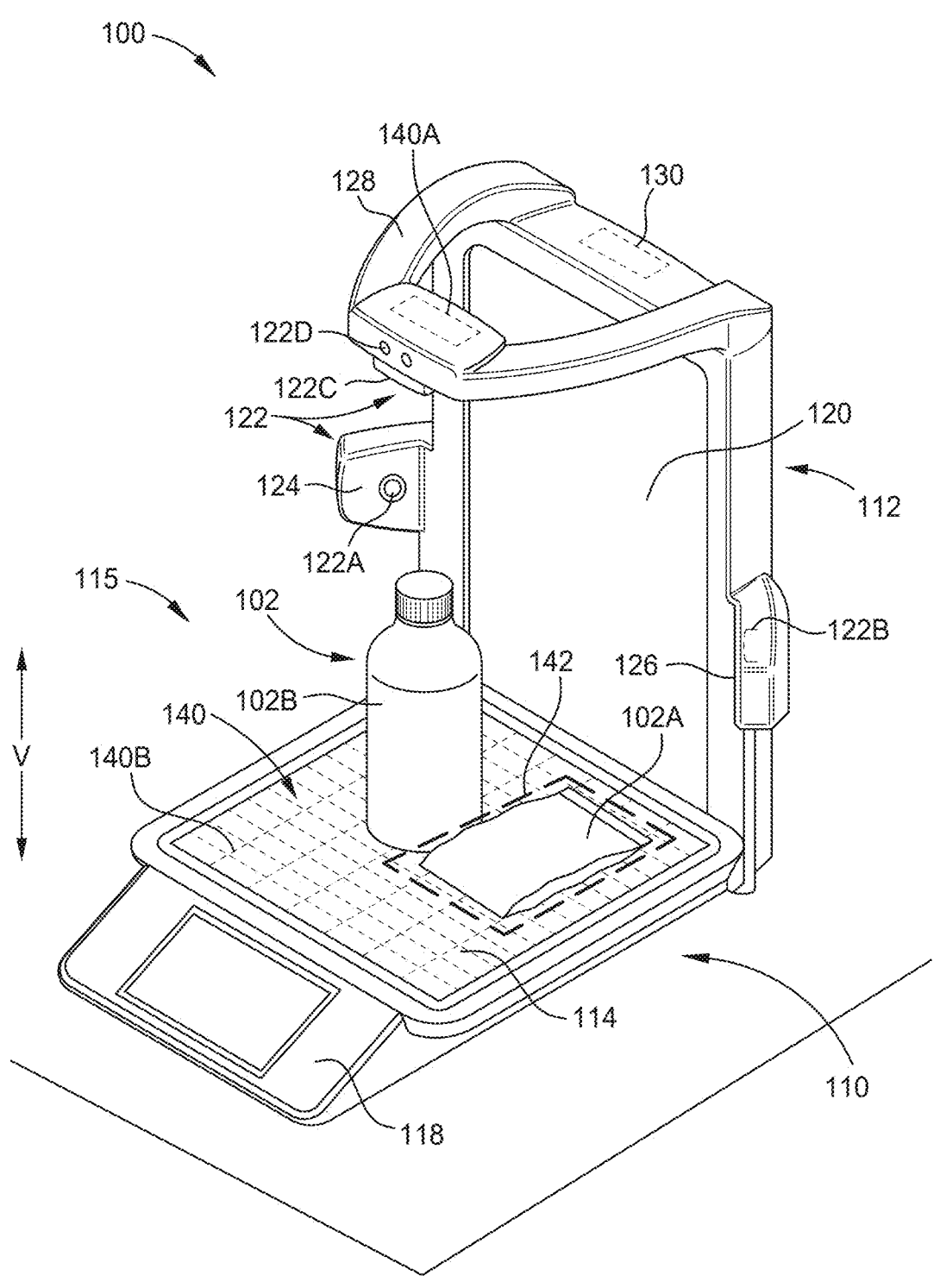
FIG. 2 illustrates a perspective view of another exemplary self-checkout system according to one or more embodiments of the present disclosure.

FIG. 2 shows an embodiment of the self-checkout system 100 having a light source 140B that can be arranged underneath, or embedded in, the platform 114. The platform 114 can be at least somewhat translucent so that light emitted by light-emitting devices of the light source 140B can travel through the platform 114, or a top translucent layer thereof, and onto an item placed on the platform 114. The light-emitting devices of the light source 140B can be arranged in an array, e.g., in a grid, and the light-emitting devices can be selectively controlled by the computing device 130 to illuminate one or more items 102 placed on the platform 114, e.g., based on the identities of the items 102. In FIG. 2, the snack bag 102A is shown illuminated by an illuminated indicator 142 projected by the light source 140B, while the bottled water 102B is not.

Accordingly, in some example embodiments, the self-checkout system 100 of FIGS. 1 and/or 2 may be an all-in-one, frictionless, self-service unit that uses computer vision, and in some embodiments sensed item weight, for item identification, and based on the identities of the items 102 placed on or near the platform 114, one or more light sources 140 can be controlled to highlight certain ones of the items 102. By using computer vision and one or more light sources 140 to illuminate certain items, shoppers can be provided with an interactive and intuitive self-checkout experience. Moreover, illuminated items can allow store personnel to more quickly identified issues and resolve problems.

FIG. 3 is a schematic representation of the self-checkout system 100. As illustrated in FIG. 3, the computing device 130 can include one or more processors 131 and one or more memory devices 132 storing a program 133, which, when executed by any combination of the one or more processors 131, causes the one or more processors 131 to perform an operation, such as causing illumination of certain items placed on or near the platform 114 (FIG. 1), which as noted above, can facilitate an interactive checkout transaction. The one or more memory devices 132 can also store data 134. The data 134 can include, among other things, an image library 135 and item data 136. The image library 135 can include images of known items from one or more viewpoints. Known items can include known purchasable items (e.g., chips, bottled water, bananas, etc. available for purchase in a retail store) and known non-purchasable items (keys, smartphones, purses, etc. that are not available for purchase within the retail store, but are known to the computing device 130). In some instances, known non-purchasable items can be inadvertently placed on the platform 114 (FIG. 1), which may affect the weight calculation of items placed on the platform 114. As will be explained further herein, it may be desirable to illuminate such an item to suggest to a shopper that the item be removed from the platform 114. The item data 136 can include data relating to the dimensions, weight, and packaging associated with the known items in the image library 135.

In some embodiments, the image library 135 and the item data 136 can be stored locally on the computing device 130, e.g., in one or more memory devices 132 thereof. In other embodiments, the image library 135 and/or the item data 136 can be stored offboard the self-checkout system 100, e.g., on a data store 150 as shown in FIG. 3. The computing device 130 can access the image library 135 and/or the item data 136 over a network 160, such as the internet. The computing device 130 can include a communication interface 137 that enables communication with over devices over the network 160 and also locally with other devices of the self-checkout system 100 via a communication bus 138. The communication interface 137 can include transmitter circuitry configured to send communication signals and receiver circuitry configured to receive communication signals. In this regard, the communication interface 137 can include transmitters, receivers, transceivers, etc. for communication over the network 160 and/or the communication bus 138. In yet other embodiments, the image library 135 and/or the item data 136 can be stored in part locally and in part remotely.

The computing device 130 is communicatively coupled with other devices/components of the shelf-checkout system 100 by way the communication bus 138, e.g., by one or more wired and/or wireless communication links. As depicted in FIG. 3, the computing device 130 can be communicatively coupled with the weight sensor 116, the user input device 118, the display 120, the cameras 122, and the light source 140 (or light sources). In at least some embodiments, the computing device 130 is communicatively coupled with one or more speakers 144 of the self-checkout system 100. In at least some embodiments, the display 120 and/or the speakers 144 can be controlled to provide instructions or an alert to a shopper or store personnel in addition to the light sources 140 being controlled to illuminate one or more items placed on or near the platform 114 (FIG. 1).

With reference now to FIGS. 1 and 3, an example manner in which the self-checkout system 100 can illuminate certain items on or near the platform 114 during a checkout transaction will now be provided. In at least one embodiment, when one of the programs 133 is executed by the one or more processors 131, the one or more processors 131 can be caused to, individually or collectively, perform an operation, including the smart illumination operation described below.

The one or more processors 131 can trigger the cameras 122 to capture images of the items 102 placed on or near the platform 114, or rather, the items 102 within the predefined zone 115. For instance, once a shopper has completed gathering items for purchase within a store, the shopper can approach the self-checkout system 100 to perform a checkout transaction. The cameras 122 can be configured to capture images of the predefined zone 115 based on one or more trigger conditions, such as an indication that one or more items 102 have been detected in the predefined zone 115, or that a shopper has approached within a predetermined proximity of the self-checkout system 100, or based on the weight sensor 116 sensing items on the platform 114, or a combination thereof. The cameras 122 can continuously capture images of the predefined zone 115 for a duration of the checkout transaction, for example. In at least some embodiments, the first camera 122A, the second camera 122B, and the third camera 122C can capture images of the items 102 on or near the platform 114 from their respective viewpoints, i.e., right-side, left-side, and overhead viewpoints. Further, in at least some embodiments, the weight sensors 116 can capture the item weight 117 of the items 102 placed on the platform 114.

The one or more processors 131 can receive the images of the one or more items 102 placed on or near the platform 114, or rather, captured images 123. The captured images 123 of the items 102 can be routed to the computing device 130 for processing. Further, the item weight 117 of the items 102 sensed by the weight sensors 116 can be provided to the computing device 130 for processing.

The one or more processors 131 can determine an identity of the one or more items 102 placed on or near the platform 114, based at least in part on the one or more images captured by the one or more cameras 122, or rather, the captured images 123. For instance, in at least some embodiments, the computing device 130 can utilize the captured images 123 to determine the dimensions of the items 102 placed on or near the platform 114. The images of the items 102 captured from multiple viewpoints can facilitate determination of the dimensions of the items 102. The captured images 123 can also be utilized by the computing device 130 to determine the packaging of the items 102. The color scheme, brand name, logos, etc. of the packaging of the items 102 can be considered, for example. Further, in some embodiments, in addition to the captured images 123, the item weight 117 of the items 102 can be received by the computing device 130 and utilized to determine a weight of the items 102 placed on the platform 114, as a total weight or individually. Any suitable technique can be used to determine the individual weights of the items 102 placed on the platform 114.

In at least some embodiments, with the dimensions and weight of the items 102 determined, the one or more processors 131 can access the image library 135 and the item data 136, and one or more subsets of a plurality of library images 139 can be selected to be used for comparison purposes, based on the determined dimensions and weight of the items 102. For instance, based on the dimensions and weight determined for a first item on the platform 114 (e.g., the snack bag 102A), a first subset of the library images 139 can be selected. The first subset of the library images 139 can include images of items known to have similar dimensions and weight as the first item based on the item data 136. The images of the first subset can be utilized for comparison purposes with the captured images 123 of the first item. Similarly, based on the dimensions and weight determined for a second item on the platform 114 (e.g., the bottled water 102B), a second subset of the library images 139 can be selected. The second subset can be a different subset than the first subset. The second subset of the library images 139 can include images of items known to have similar dimensions and weight as the second item based on the item data 136. The images of the second subset can be utilized for comparison purposes with the captured images 123 of the second item. By narrowing the library images 139 to those depicting items having similar dimensions and weight to a given item on the platform 114, the processing time for image comparison can be advantageously reduced.

Once the subsets of the library images 139 are selected for respective ones of the items 102 placed on or near the platform 114, the captured images 123 of an item can be compared to the library images 139 of the subset selected for that item. For instance, for the first item on the platform 114 (e.g., the snack bag 102A), the captured images 123 for the first item can be compared to the library images 139 of the first subset. Similarly, for the second item on the platform 114 (e.g., the bottled water 102B), the captured images 123 for the second item can be compared to the library images 139 of the second subset. In at least some embodiments, the packaging of the items 102 (e.g., the color scheme, brand name, logos, etc.) can be utilized for image comparison purposes. The one or more processors 131 can implement an image recognition program to compare the captured images 123 of the items 102 with the library images 139 of known items. When a "match" between the captured images 123 of an item and the library images 139 occurs, the one or more processors 131 can identify that item as, e.g., a known purchasable item or a known non-purchasable item, for example. In other words, when a match occurs, the item can be labeled or classified as a known item, which can either be purchasable or non-purchasable. Stated yet another way, when the captured images 123 of a given item match one or more of the library images 139 of known purchasable items, the identity of the given item can be determined as a known purchasable item. When the captured images 123 of a given item match one or more of the library images 139 of known non-purchasable items, the identity of the given item can be determined as a known non-purchasable item. When no "match" occurs between the captured images 123 of an item and the library images 139, the one or more processors 131 can identify that item as an unknown item.

In some other embodiments, the one or more processors 131 can determine an identity of the one or more items 102 placed on or near the platform 114 by comparing the captured images 123 of a given item to the plurality of library images 139 of the image library 135, and not a subset thereof. In yet other embodiments, the one or more processors 131 can determine an identity of the one or more items 102 placed on or near the platform 114 by comparing the captured images 123 of a given item to a subset of the plurality of library images 139, with the subset being determined based on the dimensions of the given item (and not its weight), the packaging of the given item (and neither its weight nor its dimensions), or a combination of the dimensions and packaging of the given item (and not its weight).

As one example, the one or more processors 131 can, based on comparing the captured images 123 of the snack bag 102A with the library images 139, identify the snack bag 102A as a known non-purchasable item, or rather, a snack bag that is known to the computing device 130, but not available for purchase. As another example, the one or more processors 131 can, based on comparing the captured images 123 of the bottled water 102B with the library images 139, identify the bottled water 102B as a known purchasable item, or rather, a bottled water that is available for purchase.

Based on the determined identities of the items 102, the one or more processors 131 can cause the light source 140A to project the illuminated indicator 142 onto at least one of the items 102 placed on or near the platform 114. Continuing with the example above, with the snack bag 102A being identified as a known non-purchasable item (i.e., an item known to the computing device 130 but not available for purchase), the one or more processors 131 can command the light source 140A to project the illuminated indicator 142 onto the snack bag 102A, e.g., as shown in FIG. 1. Illuminating the snack bag 102A can alert a shopper or store personnel, e.g., that the snack bag 102A is not available for purchase and should be removed from the platform 114. In at least some embodiments, as depicted in FIG. 1, the illuminated indicator 142 can outline the item to be illuminated, which in this example is the snack bag 102A.

In other embodiments, the illuminated indicator 142 can be projected onto an item with a certain shape, letter, number, some combination thereof, etc., based at least in part on the determined identity of an item. As one example, the illuminated indicator 142 can be projected by the light source 140A onto an item as a question mark, or "?", e.g., when an item is identified as an unknown item. As another example, the illuminated indicator 142 can be projected by the light source 140A onto an item as the letter X, or "X", e.g., when an item is identified as being a known non-purchasable item.

Figure 4:
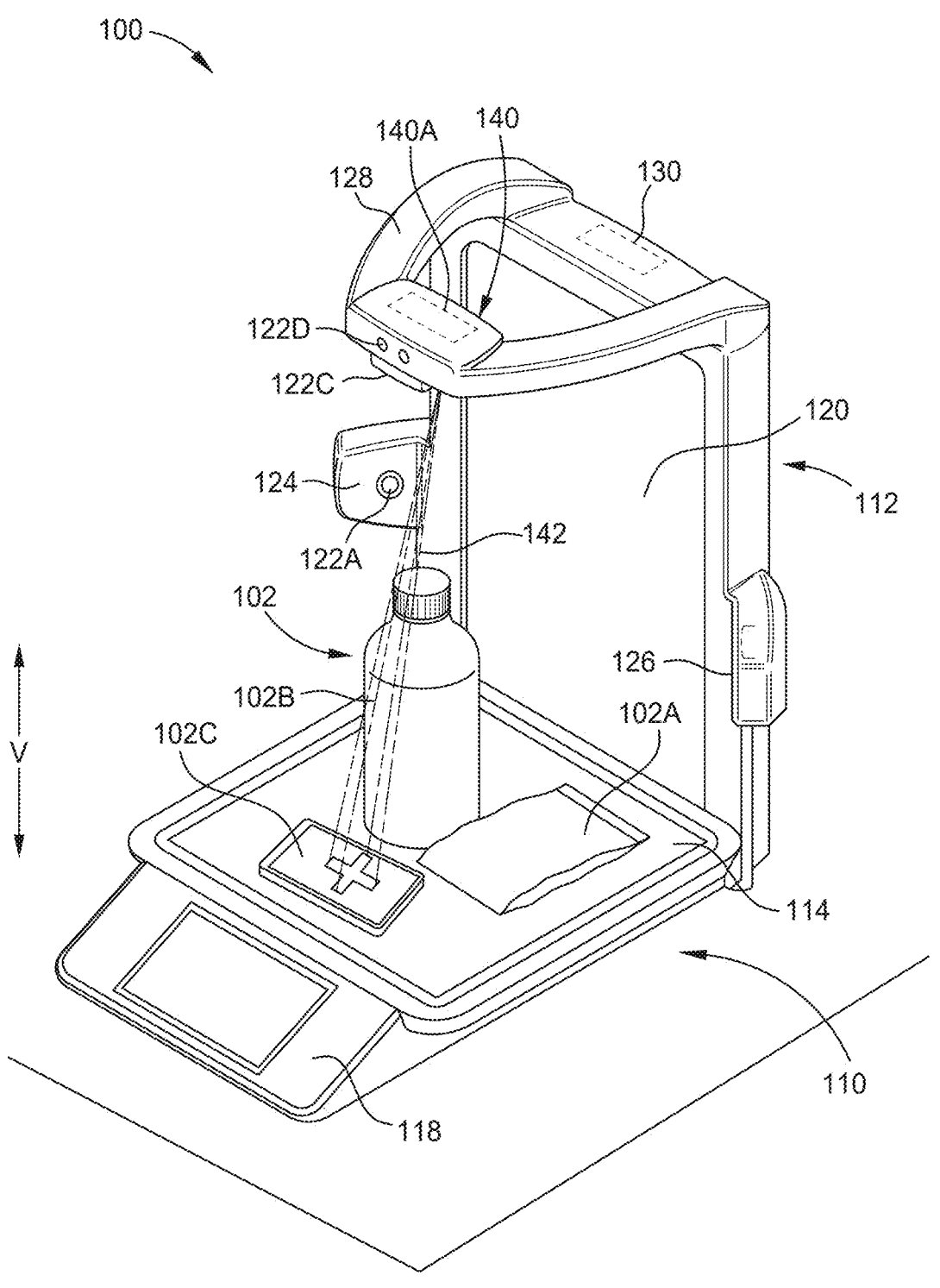
FIG. 4 illustrates a perspective view of the self-checkout system of FIG. 1 illuminating an item on a platform thereof.

For instance, as depicted in FIG. 4, the illuminated indicator 142 is shown being projected by the light source 140A onto a known non-purchasable item as an "X". In FIG. 4, the non-purchasable item is a smartphone 102C that has inadvertently been placed on the platform 114. The "X" projected onto the smartphone 102C can signify to the shopper or store personnel that the smartphone 102C should be removed from the platform 114.

In some embodiments, referring again to FIGS. 1 and 3, the illuminated indicator 142 projected by the light source 140A can be represented with a predefined color based at least in part on the identity of an item to be illuminated. As one example, the illuminated indicator 142 can be projected by the light source 140A onto an item with yellow light, e.g., when an item is identified as an unknown item. As another example, the illuminated indicator 142 can be projected by the light source 140A onto an item with red light, e.g., when an item is identified as a known non-purchasable item. As yet another example, the illuminated indicator 142 can be projected by the light source 140A onto an item with green light, e.g., when an item is identified as a known purchasable item for which a coupon or special is available. Accordingly, by projecting the illuminated indicator 142 with a predefined color, shoppers and/or store personnel can be alerted more readily to an issue type or opportunity.

In at least some embodiments, the one or more processors 131 can cause, in addition to causing the light source 140A to project the illuminated indicator 142 onto at least one item, other instructions or alerts to be presented to a shopper or store personnel. As one example, the one or more processors 131 can cause the display 120 to present instructions or an alert associated with the illuminated item to a shopper and/or store personnel. The instructions or alert can indicate a desired action for the shopper or store personnel to take with respect to the illuminated item, such as "remove item from platform" or "move item to platform" or "item not recognized". In this regard, the light source 140A can project the illuminated indicator 142 onto an item in coordination with the display 120 presenting instructions or an alert to the shopper and/or store personnel.

As another example, the one or more processors 131 can cause the speakers 144 to present audible instructions or an audible alert associated with the illuminated item to a shopper and/or store personnel. The audible instructions or alert can indicate a desired action for the shopper or store personnel to take with respect to the illuminated item, for example. In this way, the light source 140A can project the illuminated indicator 142 onto an item in coordination with the speakers 144 presenting audible instructions or an audible alert to the shopper and/or store personnel.

In at least some embodiments, the light source of a self-checkout system can be controlled to project an illuminated indicator onto an item, and then can project the illuminated indicator away from the platform to suggest to a shopper and/or store personnel that the item is to be removed from the platform. That is, initially, the light source can be controlled to project an illuminated indicator onto an item on the platform. Then, the light source can be controlled to project the illuminated indicator offboard of the platform to suggest that the item be moved from the platform to the location where the illuminated indicator is projected offboard. Examples are provided below.

Figure 5:
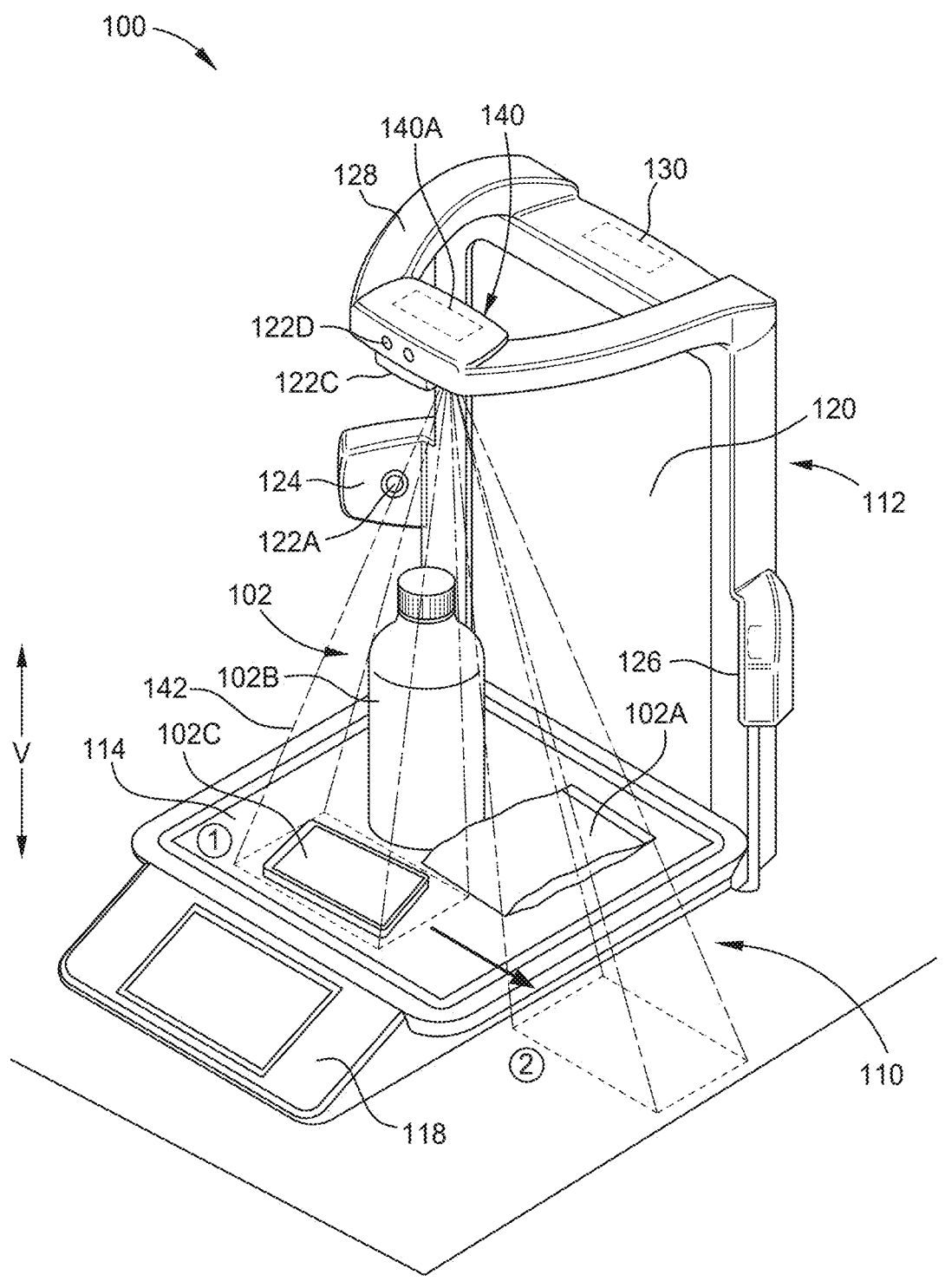
FIG. 5 illustrates a perspective view of the self-checkout system of FIG. 1 illuminating an item on the platform.

FIG. 5 depicts the self-checkout system 100 and shows the light source 140A moving the illuminated indicator 142 from highlighting the smartphone 102C (which can be a known non-purchasable item or an unknown item, for example) to a position offboard of the platform 114. Initially, the light source 140A can be controlled to project the illuminated indicator 142 onto the smartphone 102C. The projection of the illuminated indicator 142 onto the smartphone 102C can be considered a first illuminated position (as indicated by the encircled "1" in FIG. 5). Then, the light source 140A can be controlled to project the illuminated indicator 142 onto a position offboard of the platform 114. The projection of the illuminated indicator 142 offboard of the platform 114 can be considered a second illuminated position (as indicated by the encircled "2" in FIG. 5). The movement of the illuminated indicator 142 from the first illuminated position to the second illuminated position can suggest to a shopper or store personnel that the smartphone 102C should be removed from the platform 114.

In some embodiments, the light source 140A can be controlled to iterate projecting the illuminated indicator 142 between the first and second illuminated positions, e.g., until the smartphone 102C is removed from the platform 114 or after a predefined number of iterations, such as three (3)

iterations. In other embodiments, the light source 140A can be controlled to project the illuminated indicator 142 onto the smartphone 102C, and then to blink at least twice at the second illuminated position. This process can also iterate. In some further embodiments, the light source 140A can be controlled to "drag" or continuously project the illuminated indicator 142 when moving from the first illuminated position to the second illuminated position. In embodiments in which the light source 140A is controlled to iterate projecting the illuminated indicator 142 between the first and second illuminated positions, the light source 140A can be controlled to not "drag" or continuously project the illuminated indicator 142 when moving from the second illuminated position to the first illuminated position; rather, after the light source 140A drags or continuously projects the illuminated indicator 142 when moving from the first illuminated position to the second illuminated position, the light source 140A can be controlled to cease projecting while the light source 140A adjusts its light emitter to focus back on the first illuminated position, e.g., so that the illuminated indicator is shown being dragged away from the platform 114 but not toward the platform 114.

In some further embodiments, the light source 140A can be controlled to initially project the illuminated indicator 142 onto the smartphone 102C with a first indicator type (e.g., an "X" as in FIG. 4), and then, when projecting the illuminated indicator 142 onto the second illuminated position, the light source 140A can be controlled to project the illuminated indicator 142 offboard the platform with a second indicator type (e.g., a checkmark). Changing the illuminated indicator type from one illuminated position to another can advantageously make the suggestion to move the highlighted item off of the platform 114 more evident to a shopper or store personnel. In some embodiments, the "X" can be projected with red colored light while the checkmark can be projected with green colored light, which can make the suggestion even more evident to a shopper and/or store personnel.

In at least some embodiments, the light source of a self-checkout system can be controlled to project the illuminated indicator onto an item that is placed near, but not on, the platform, and then can project the illuminated indicator toward or one the platform to suggest to a shopper and/or store personnel that the item is to be moved onto the platform. That is, initially, the light source can be controlled to project an illuminated indicator onto an item positioned offboard the platform. Then, the light source can be controlled to project the illuminated indicator toward or onboard the platform to suggest that the item be moved onto the platform. Examples are provided below.

Figure 6:
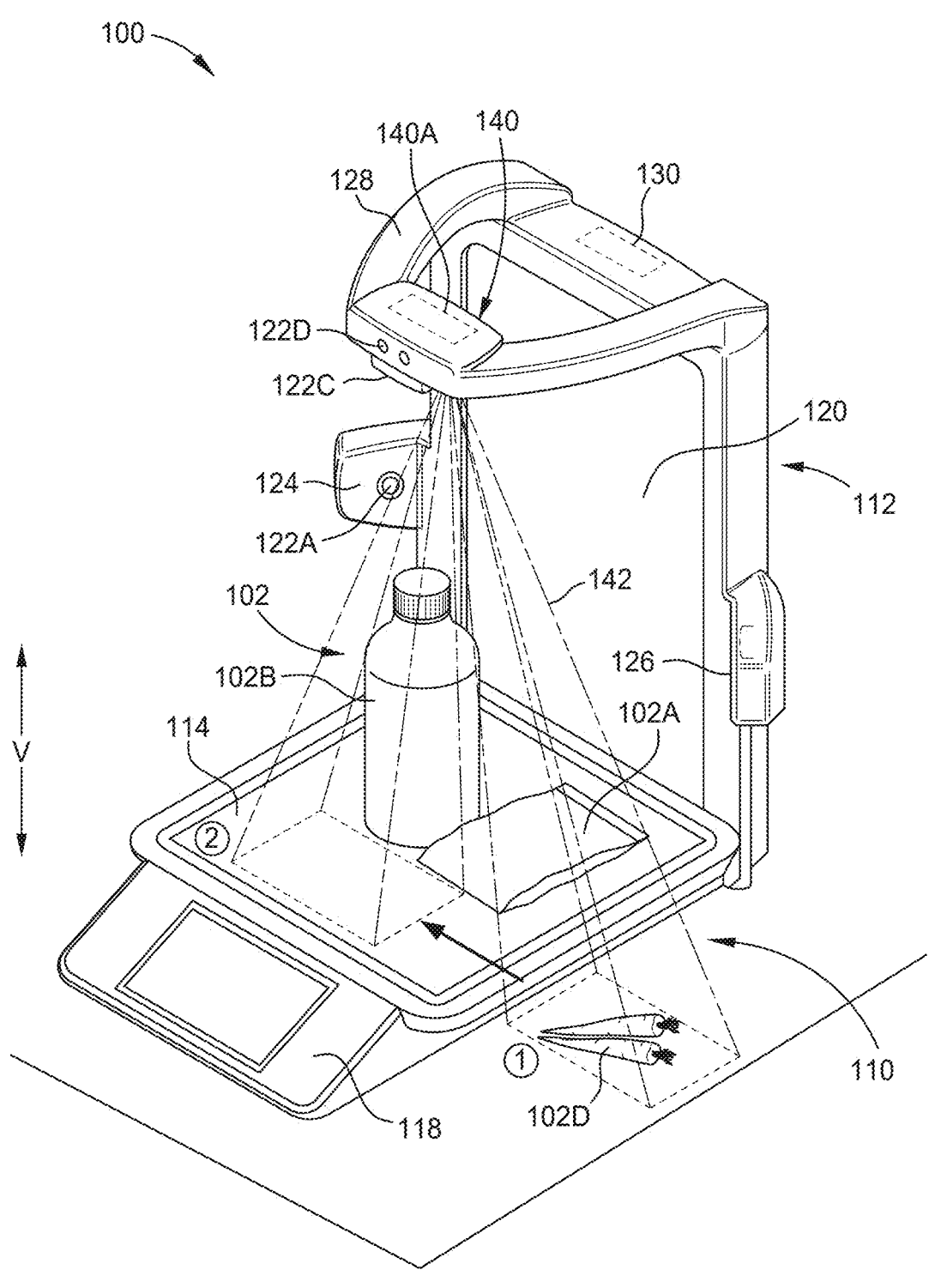
FIG. 6 illustrates a perspective view of the self-checkout system of FIG. 1 illuminating an item near the platform.

FIG. 6 depicts the self-checkout system 100 and shows the light source 140A moving the illuminated indicator 142 from highlighting an item (carrots 102D in this example) positioned near, but not on, the platform 114 to a position onboard the platform 114. The carrots 102D can be identified as a known purchasable item that should be placed on the platform 114, for example. As illustrated in FIG. 6, the light source 140A can be controlled initially to project the illuminated indicator 142 onto the carrots 102D positioned offboard of the platform 114. The projection of the illuminated indicator 142 onto the carrots 102D can be considered a first illuminated position (as indicated by the encircled "1" in FIG. 6). Then, the light source 140A can be controlled to project the illuminated indicator 142 onto a position onboard the platform 114. The projection of the illuminated indicator 142 onboard the platform 114 can be considered a second illuminated position (as indicated by the encircled "2" in FIG. 6). The movement of the illuminated indicator 142 from the first illuminated position to the second illuminated position can suggest to a shopper or store personnel that the carrots 102D should be moved onto the platform 114.

In some embodiments, the light source 140A can be controlled to iterate projecting the illuminated indicator 142 between the first and second illuminated positions, e.g., until the carrots 102D are moved onto the platform 114 or after a predefined number of iterations, such as three (3) iterations. In other embodiments, the light source 140A can be controlled to project the illuminated indicator 142 onto the carrots 102D, and then to blink at least twice at the second illuminated position. This process can also iterate. In some further embodiments, the light source 140A can be controlled to "drag" or continuously project the illuminated indicator 142 when moving from the first illuminated position to the second illuminated position. In embodiments in which the light source 140A is controlled to iterate projecting the illuminated indicator 142 between the first and second illuminated positions, the light source 140A can be controlled to not "drag" or continuously project the illuminated indicator 142 when moving from the second illuminated position to the first illuminated position; rather, after the light source 140A drags or continuously projects the illuminated indicator 142 when moving from the first illuminated position to the second illuminated position, the light source 140A can be controlled to cease projecting while the light source 140A adjusts its light emitter to focus back on the first illuminated position, e.g., so that the illuminated indicator is shown being dragged toward the platform 114 but not away from the platform 114.

In some further embodiments, the light source 140A can be controlled to initially project the illuminated indicator 142 onto the carrots 102D with a first indicator type (e.g., a red colored outline of the carrots 102D), and then, when projecting the illuminated indicator 142 onto the second illuminated position, the light source 140A can be controlled to project the illuminated indicator 142 onboard the platform 114 with a second indicator type (e.g., a green colored checkmark). Changing the illuminated indicator type and/or color of light from one illuminated position to another can advantageously make the suggestion to move the highlighted item onto the platform 114 more evident to a shopper or store personnel.

Figure 7:
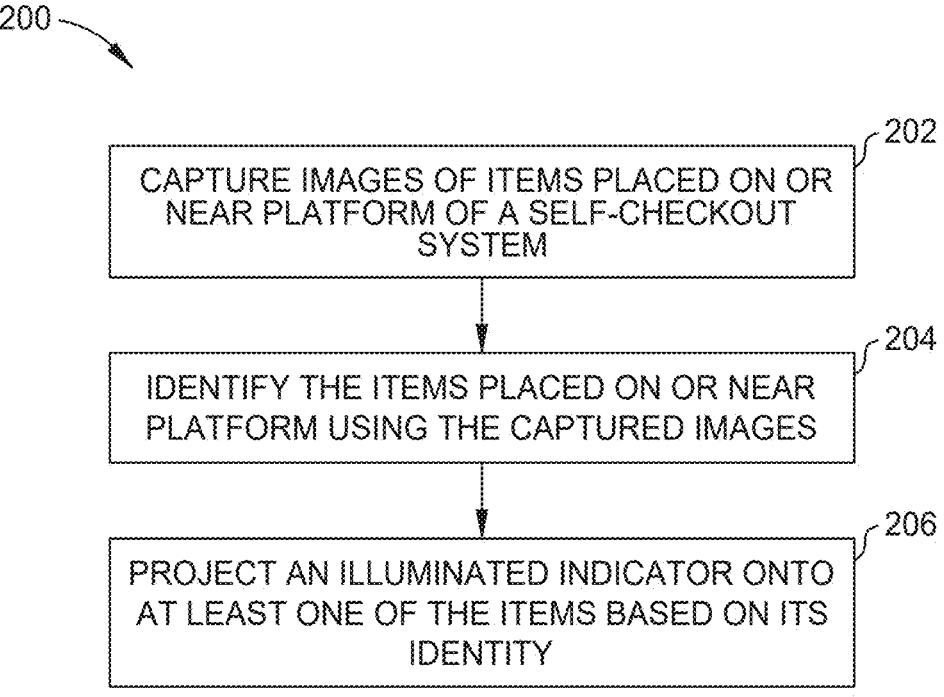
FIG. 7 is a flow diagram for a method according to one or more embodiments of the present disclosure.

FIG. 7 is a flow diagram for a method 200 of illuminating one or more items within a predefined zone of a self-checkout system according to one or more embodiments of the present disclosure.

At 202, the method 200 can include capturing, using one or more cameras, one or more images of one or more items placed within a predefined zone of a self-checkout system on or near a platform of the self-checkout system. For instance, the self-checkout system can include at least three (3) cameras, with at least one of these cameras being at a different height than the others. The cameras can capture images of the items on or near the platform.

At 204, the method 200 can include determining an identity of the one or more items placed within the predefined zone on or near the platform, based at least in part on the one or more images captured by the one or more cameras. For instance, the cameras and a computing device can form a computer vision system of the self-checkout system. The computing device can be used to implement an image analysis technique to determine, for example, the shape, dimension, weight, and/or location of one or more items placed in and/or in close proximity to the platform.

The determined shape, dimension, weight, and/or location, of one or more items, may be used to identify one or more of the items.

At 206, the method 200 can include projecting, with a light source of the self-checkout system, an illuminated indicator onto at least one item of the one or more items placed within the predefined zone on or near the platform, based on the identity of the at least one item. For instance, the self-checkout system can include a light source, such as a projector or laser, which can be used to project an illuminated indicator onto at least one item on or near the platform. As one example, an item can be identified as an unknown item. The light source can be controlled to project an illuminated indicator onto the unknown item, e.g., to signal to a shopper or store personnel that the item should be removed from the platform or should otherwise be removed from the buy zone. As another example, an item can be identified as a known non-purchasable item. The light source can be controlled to project an illuminated indicator onto the known non-purchasable item, e.g., to signal to a shopper or store personnel that the item should be removed from the platform or should otherwise be removed from the buy zone. As yet another example, an item can be identified as a known purchasable item that has been scanned but not placed on the platform. The light source can be controlled to project an illuminated indicator onto the known purchasable item, e.g., to signal to a shopper or store personnel that the item should be moved onto the platform.

In some implementations, the method 200 can include projecting, with the light source, the illuminated indicator to an illuminated position at a distance from the at least one item to suggest that the at least one item be moved to the illuminated position. As one example, if the item is placed on the platform and should not be, as determined by the identity of the item, the light source can be controlled to project the illuminated indicator to a position offboard of the platform. The projection of the illuminated indicator to this illuminated position can suggest to a shopper or store personnel that the item be moved offboard the platform. As another example, if the item is placed offboard of the platform and should actually be placed onboard the platform, as determined by the identity of the item, the light source can be controlled to project the illuminated indicator to a position onboard the platform. The projection of the illuminated indicator to this illuminated position can suggest to a shopper or store personnel that the item be moved onto the platform.

Accordingly, illuminating certain items within the buy zone can advantageously facilitate a more frictionless and interactive shopping experience for a buyer and can allow store personnel to more quickly identify issues and resolve problems, among other benefits.

The descriptions of the various embodiments have been presented for purposes of illustration, but are not intended to be exhaustive or limited to the embodiments disclosed. Instead, any combination of the noted features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s).

Aspects of the described embodiments may take the form of an entirely hardware embodiment, an entirely software embodiment (including firmware, resident software, microcode, etc.) or an embodiment combining software and hardware aspects that may generally be referred to herein as a "circuit," "module" or "system."

One or more of the described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the described embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

Aspects of the described embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a described manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to one or more embodiments, other and further embodiments may be devised without departing from the basic scope thereof, and the scope thereof is determined by the claims that follow.

What is claimed is:

1. A self-checkout system, comprising:
a platform supported by a back panel;
a halo arranged above the platform, the halo comprising a first camera oriented in a forward facing position and a second camera oriented in a downward facing position arranged to capture one or more images from an overhead viewpoint of a predefined zone of the self-checkout system;
a first arm extending from the back panel, the first arm comprising a third camera arranged to capture one or more images from a first-side viewpoint of the predefined zone of the self-checkout system;
a second arm extending from the back panel at an opposite side position from the first arm, the second arm comprising a fourth camera arranged to capture one or more images from a second-side viewpoint of the predefined zone of the self-checkout system;
a light source attached to the platform supported by the halo arranged above the platform; and
a computing device having one or more processors and one or more memory devices storing a program, which, when executed, causes the one or more processors to, individually or collectively, perform an operation, comprising:
receiving one or more images of one or more items within the predefined zone of the self-checkout system, the one or more images being captured by the second camera oriented in a downward facing position, the third camera arranged to capture the one or more images from the first-side viewpoint of a predefined zone of the self-checkout system, and the fourth camera arranged to capture the one or more images from the second-side viewpoint of the predefined zone of the self-checkout system;
determining an identity of the one or more items placed within the predefined zone, based at least in part on the one or more images captured by the second camera oriented in a downward facing position, the third camera extending from the first arm, and the fourth camera extending from a second arm; and
causing the light source to project an illuminated indicator onto at least one item of the one or more items placed within the predefined zone, based on the identity of the at least one item.

2. The self-checkout system of claim 1, wherein the second, third, and fourth cameras capture the one or more images from a different viewpoint outside of the predefined zone of the self-checkout system.

3. The self-checkout system of claim 1, wherein the light source is arranged underneath or embedded in the platform.

4. The self-checkout system of claim 1, wherein the identity of each of the one or more items is determinable as one of a plurality of known items or as an unknown item.

5. The self-checkout system of claim 1, further comprising:
wherein the operation further comprises:
determining a dimension and a weight of each of the one or more items placed on the platform within the predefined zone; and
comparing the one or more images of the one or more items placed on the platform to respective subsets of a plurality of library images of known items, based at least in part on the dimension and the weight of a given one of the one or more items,
wherein the identity of a given item of the one or more items is determined as a known item when the one or more images of the given item match one or more of the plurality of library images of known items of the subset associated with the given item, and
wherein the identity of a given item of the one or more items is determined as an unknown item when the one or more images of the given item do not match any of the plurality of library images of known items of the subset associated with the given item.

6. The self-checkout system of claim 1, wherein the operation further comprises:
comparing the one or more images of the one or more items placed within the predefined zone to a plurality of library images of known items,
wherein the identity of a given item of the one or more items is determined as a known purchasable item when the one or more images of the given item match one or more of the library images of known purchasable items,
wherein the identity of a given item of the one or more items is determined as a known non-purchasable item when the one or more images of the given item match one or more of the library images of known non-purchasable items, and
wherein the at least one item onto which the illuminated indicator is projected is at least one of the known non-purchasable items while the known purchasable items are not illuminated by the light source with an illuminated indicator.

7. The self-checkout system of claim 1, further comprising:
wherein the at least one item onto which the illuminated indicator is projected is placed near, but not on, the platform within the predefined zone, and wherein in causing the light source to project the illuminated indicator onto the at least one item, the light source causes the illuminated indicator to illuminate the at least one item at a first illuminated position offboard of the platform and then causes the illuminated indicator to illuminate a second illuminated position that is onboard the platform, or vice versa.

8. The self-checkout system of claim 1, further comprising:
wherein the at least one item onto which the illuminated indicator is projected is placed on the platform within the predefined zone, and wherein in causing the light source to project the illuminated indicator onto the at least one item, the light source causes the illuminated indicator to illuminate the at least one item at a first illuminated position onboard the platform and then causes the illuminated indicator to illuminate a second illuminated position that is offboard of the platform, or vice versa.

9. The self-checkout system of claim 1, wherein in causing the light source to project the illuminated indicator onto the at least one item, the light source causes the illuminated indicator to illuminate the at least one item at a first illuminated position and then causes the illuminated indicator to illuminate a second illuminated position, wherein the illuminated indicator is a first indicator type at the first illuminated position and a second indicator type at the second illuminated position, with the first indicator type being different than that second indicator type.

10. The self-checkout system of claim 1, wherein in causing the light source to project the illuminated indicator onto the at least one item, the light source causes the illuminated indicator to illuminate the at least one item at a first illuminated position and then causes the illuminated indicator to illuminate a second illuminated position, wherein the illuminated indicator is a first color at the first illuminated position and a second color at the second illuminated position.

11. The self-checkout system of claim 1, wherein in causing the light source to project the illuminated indicator onto the at least one item, the light source causes the illuminated indicator to illuminate the at least one item at a first illuminated position and then causes the illuminated indicator to illuminate a second illuminated position, wherein the illuminated indicator is continuously projected and dragged from the first illuminated position to the second illuminated position.

12. The self-checkout system of claim 1, wherein in causing the light source to project the illuminated indicator onto the at least one item, the light source causes the illuminated indicator to illuminate the at least one item with a color chosen from a plurality of colors based at least in part on the identity of the at least one item.

13. The self-checkout system of claim 1, wherein in causing the light source to project the illuminated indicator onto the at least one item, the light source causes the illuminated indicator to illuminate the at least one item with an indicator type chosen from a plurality of indicator types based at least in part on the identity of the at least one item.

14. A computer-readable storage medium having computer-readable program code embodied therewith, the computer-readable program code executable by one or more computer processors to, individually or collectively, perform an operation, comprising:

receiving, from (i) a first camera oriented in a downward facing position arranged to capture an overhead viewpoint of one or more items within a predefined zone of the self-checkout system, (ii) a second camera extending from a first arm of the self-checkout system arranged to capture a first-side viewpoint of the one or more items within the predefined zone of the self-checkout system, (iii) third camera extending from a second arm of the self-checkout system arranged to capture a second-side viewpoint of the one or more items within the predefined zone, one or more images of the one or more items placed within the predefined zone of the self-checkout system;

determining an identity of the one or more items placed within the predefined zone, based at least in part on the one or more images captured by the (i) the first camera oriented in a downward facing position, (ii) the second camera extending from the first arm, and the (iii) third camera extending from a second arm; and causing a light source of the self-checkout system to project an illuminated indicator onto at least one item of the one or more items placed within the predefined zone, based on the identity of the at least one item.

15. The computer-readable storage medium of claim 14, wherein the at least one item onto which the illuminated indicator is projected is placed within the predefined zone near, but not on, a platform of the self-checkout system, and wherein in causing the light source to project the illuminated indicator onto the at least one item, the light source causes the illuminated indicator to illuminate the at least one item at a first illuminated position offboard of the platform and then causes the illuminated indicator to illuminate a second illuminated position that is onboard the platform, or vice versa.

16. The computer-readable storage medium of claim 14, wherein the at least one item onto which the illuminated indicator is projected is placed within the predefined zone on a platform of the self-checkout system, and wherein in causing the light source to project the illuminated indicator onto the at least one item, the light source causes the illuminated indicator to illuminate the at least one item at a first illuminated position onboard the platform and then causes the illuminated indicator to illuminate a second illuminated position that is offboard of the platform, or vice versa.

17. The computer-readable storage medium of claim 14, wherein in causing the light source to project the illuminated indicator onto the at least one item, the light source causes the illuminated indicator to illuminate the at least one item with:

a color chosen from a plurality of colors based at least in part on the identity of the at least one item; or an indicator type chosen from a plurality of indicator types based at least in part on the identity of the at least one item; or both.

18. A method comprising:

capturing, using (i) a first camera oriented in a downward facing position arranged to capture an overhead viewpoint, (ii) a second camera extending from a first arm arranged to capture a first-side viewpoint, and a (iii) third camera extending from a second arm arranged to capture a second-side viewpoint, one or more images of one or more items from the overhead viewpoint, the first-side viewpoint, and the second-side viewpoint of one or more items placed within a predefined zone of a self-checkout system on or near a platform of the self-checkout system;

determining an identity of the one or more items placed within the predefined zone, based at least in part on the one or more images captured by the (i) the first camera oriented in a downward facing position, (ii) the second camera extending from the first arm, and the (iii) third camera extending from a second arm; and projecting, with a light source of the self-checkout system, an illuminated indicator onto at least one item of the one or more items placed within the predefined zone, based on the identity of the at least one item.

19. The method of claim 18, further comprising:

projecting, with the light source, the illuminated indicator to an illuminated position at a distance from the at least one item to suggest that the at least one item be moved to the illuminated position.

* * * * *